(12) United States Patent
Kim et al.

(10) Patent No.: US 11,927,852 B2
(45) Date of Patent: Mar. 12, 2024

(54) OPTICAL DEVICE

(71) Applicant: LG Chem, Ltd., Seoul (KR)

(72) Inventors: Jung Woon Kim, Daejeon (KR); Jung Sun You, Daejeon (KR); Doo Young Huh, Daejeon (KR); Dong Hyun Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 18/031,838

(22) PCT Filed: Oct. 28, 2021

(86) PCT No.: PCT/KR2021/015292
§ 371 (c)(1),
(2) Date: Apr. 13, 2023

(87) PCT Pub. No.: WO2022/092842
PCT Pub. Date: May 5, 2022

(65) Prior Publication Data
US 2023/0408872 A1 Dec. 21, 2023

(30) Foreign Application Priority Data
Oct. 29, 2020 (KR) .................. 10-2020-0142094

(51) Int. Cl.
*G02F 1/1339* (2006.01)
*G02F 1/1337* (2006.01)
*G02F 1/137* (2006.01)
(52) U.S. Cl.
CPC ........ *G02F 1/13398* (2021.01); *G02F 1/1337* (2013.01); *G02F 1/137* (2013.01)
(58) Field of Classification Search
None
See application file for complete search history.

(56) References Cited

U.S. PATENT DOCUMENTS

2002/0113928 A1 8/2002 Hachisu et al.
2018/0074377 A1 3/2018 You et al.
(Continued)

FOREIGN PATENT DOCUMENTS

CN 207851460 U 9/2018
JP 2002162633 A 6/2002
(Continued)

OTHER PUBLICATIONS

Jin-Jang. S. et al., "P-120: Tight Bonding of Two Plastic Substrates for Flexible LCDs", SID Symposium Digest of Technical Papers, Jul. 2012, pp. 1-2, vol. 38, Issue 1. [English translation of abstract only].

(Continued)

*Primary Examiner* — Phu Vu
(74) *Attorney, Agent, or Firm* — Lerner David LLP

(57) ABSTRACT

An optical device is disclosed herein. In some embodiments, a optical device includes a liquid crystal element having a top surface, a bottom surface, and sides separating the top surface and the bottom surface, and an outer layer surrounding the sides of the liquid crystal element, wherein the liquid crystal element comprises a first base layer, a second base layer, a liquid crystal layer positioned between the first base layer and the second base layer, a pressure-sensitive adhesive layer positioned between the first base layer and the liquid crystal layer, and a spacer to maintain a gap between the first base layer and the second base layer, wherein the optical device satisfies Equation 1:

$$-T2\times 0.4 \leq T1-T2 \leq T2\times 0.4 \qquad \text{[Equation 1]}$$

wherein, T1 is a thickness of the outer layer, and T2 is a thickness of the liquid crystal element.

17 Claims, 3 Drawing Sheets

(56) References Cited

U.S. PATENT DOCUMENTS

| | | | |
|---|---|---|---|
| 2019/0366811 A1 | 12/2019 | O'Keeffe | |
| 2020/0056423 A1 | 2/2020 | Bjergaard et al. | |

FOREIGN PATENT DOCUMENTS

| | | | |
|---|---|---|---|
| JP | 2016154600 | A | 9/2016 |
| JP | 2020007182 | A | 1/2020 |
| KR | 20070091794 | A | 9/2007 |
| KR | 101999963 | B1 | 7/2019 |
| KR | 20200044473 | A | 4/2020 |
| WO | 2000037993 | A2 | 6/2000 |
| WO | 2020003252 | A1 | 1/2020 |
| WO | 202026735 | A | 7/2020 |

OTHER PUBLICATIONS

International Search Report for Application No. PCT/KR2021/015292 dated Feb. 10, 2022, pp. 1-3.

[Figure 1]
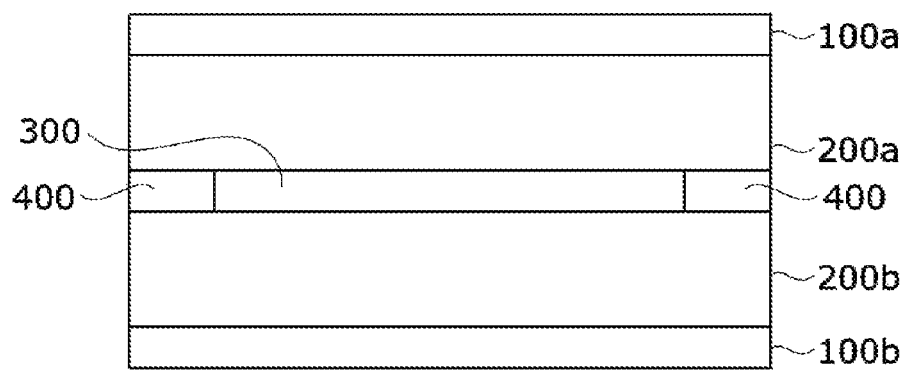
[Figure 2]
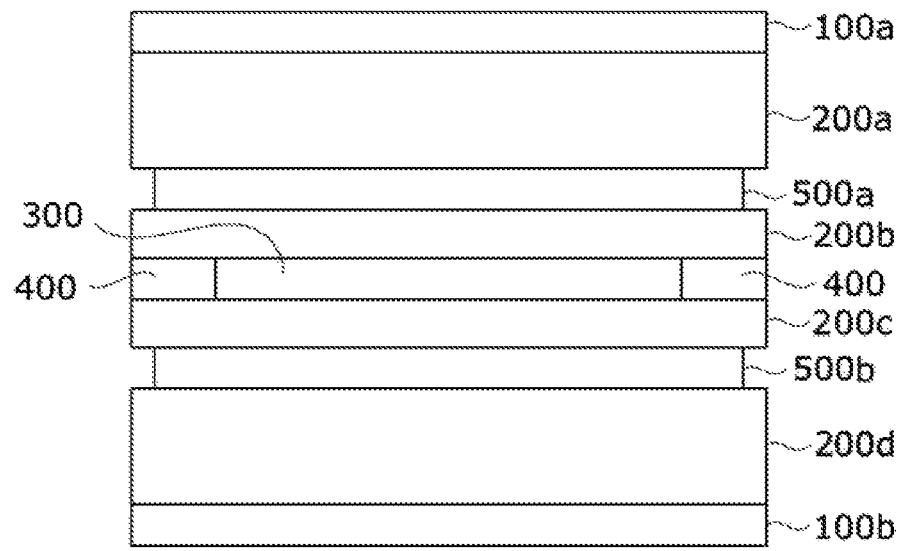

[Figure 3]
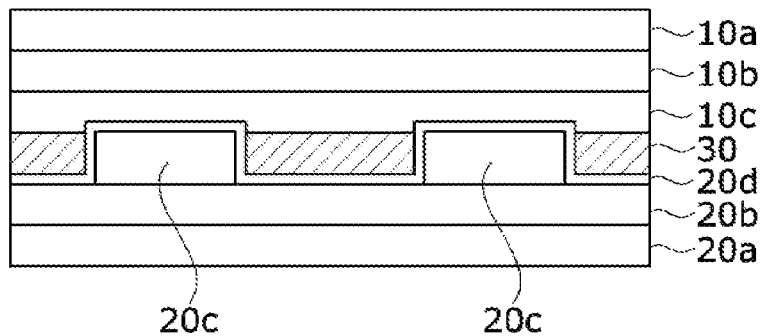
[Figure 4]
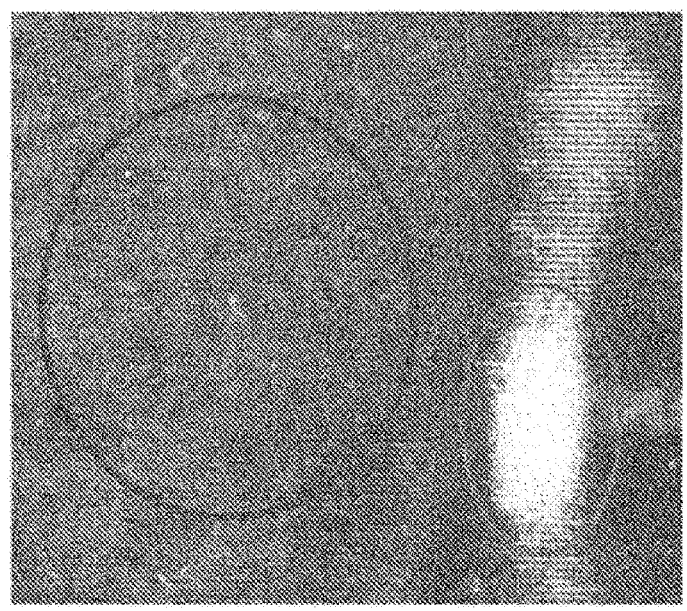

[Figure 5]
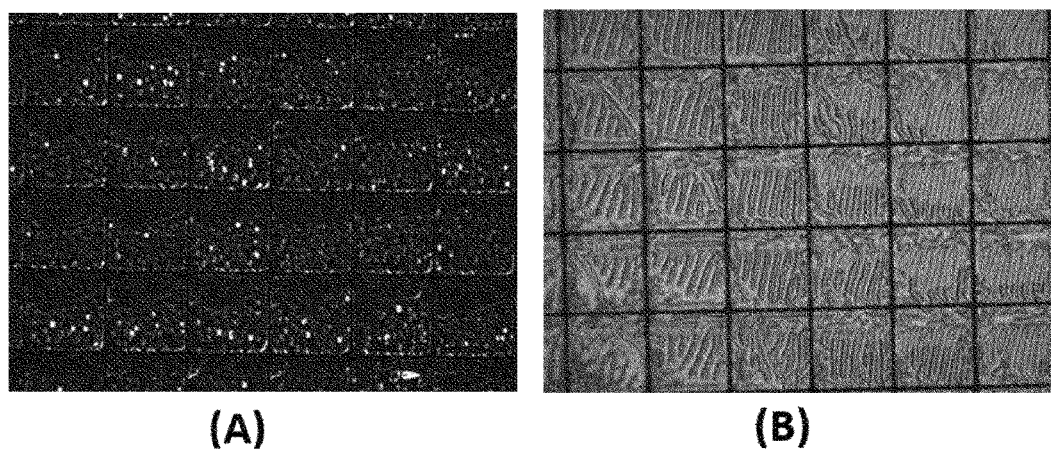
(A)            (B)

OPTICAL DEVICE

CROSS-REFERENCE TO RELATED APPLICATIONS

The present application is a national phase entry under 35 U.S.C. § 371 of International Application No. PCT/KR2021/015292, filed on Oct. 28, 2021, which claims priority from Korean Patent Application No. 10-2020-0142094 dated Oct. 29, 2020, the disclosures of which are incorporated by reference herein.

TECHNICAL FIELD

The present disclosure relates to an optical device.

BACKGROUND ART

For long-term stability and large-area scalability of a liquid crystal cell using flexible substrates, it is important that a cell gap is maintained between upper and lower substrates and adhesion force is imparted between the upper and lower substrates.

In Non-Patent Document 1 ("Tight Bonding of Two Plastic Substrates for Flexible LCDs" SID Symposium Digest, 38, pp. 653-656 (2007)), a technique for forming an organic film pattern in the form of a column or wall with a cell gap height on one substrate and fixing it to the opposite substrate using an adhesive is disclosed. However, in such a technique, the adhesive must be located only on the column surface or wall surface, but the technique of micro-stamping the adhesive on the column surface or wall surface has high process difficulty; the control of the adhesive thickness and area is difficult; upon lamination of the upper and lower substrates, there is a high probability that the adhesive will be pushed out; and there is a risk that the adhesive may be contaminated into the alignment film or liquid crystal.

BRIEF DESCRIPTION OF DRAWINGS

FIG. 1 is a cross-sectional diagram of an exemplary optical device of the present disclosure.

FIG. 2 is a cross-sectional diagram of an exemplary optical device of the present disclosure.

FIG. 3 is a cross-sectional diagram of an exemplary liquid crystal element of the present disclosure.

FIG. 4 is a photograph of the optical device of Comparative Example 1.

FIGS. 5A and 5B are a microscope images of Comparative Example 1.

DISCLOSURE

Technical Problem

In order that the cell gap of the liquid crystal cell is maintained and the attachment force is secured between the upper substrate and the lower substrate, it may be considered that a spacer and an alignment film are formed on the lower substrate and a pressure-sensitive adhesive layer having both liquid crystal orientation force and adhesion force is formed on the upper substrate, followed by lamination. However, such a structure is vulnerable to external pressures due to the very low modulus of the pressure-sensitive adhesive layer, whereby it is difficult to obtain a good appearance quality in an autoclave process at high temperatures and high pressures. Specifically, when the structural stability of the liquid crystal cell is not ensured in the autoclave process, defects such as cell gap collapse, or flowing and/or crowding of the liquid crystals may occur, which cause a decrease in the electro-optical properties and appearance uniformity of the liquid crystal cell.

The present disclosure provides an optical device that can ensure structural stability and good quality uniformity by maintaining the cell gap of the liquid crystal cell properly, having excellent attachment force between the upper substrate and the lower substrate, and minimizing defects such as pressing or crowding.

Technical Solution

Among the physical properties mentioned in this specification, when the measured temperature affects the results, the relevant physical property is a physical property measured at room temperature, unless otherwise specified. The term room temperature is a natural temperature without heating or cooling, which is usually a temperature in the range of about 10° C. to 30° C., or about 23° C. or about 25° C. or so. In addition, unless otherwise specified in the specification, the unit of temperature is ° C. Among the physical properties mentioned in this specification, when the measured pressure affects the results, the relevant physical property is a physical property measured at normal pressure, unless otherwise specified. The term normal pressure is a natural pressure without pressurization or depressurization, where usually about 1 atmosphere or so is referred to as normal pressure.

The present disclosure relates to an optical device. FIG. 1 exemplarily shows an optical device of the present disclosure. As shown in FIG. 1, the optical device may comprise a first outer substrate (100a), a second outer substrate (100b) disposed opposite to the first outer substrate (100a), and a liquid crystal element (300) positioned between the first outer substrate (100a) and the second outer substrate (100b). The optical device may comprise at least one or more intermediate layers positioned between the first outer substrate and the liquid crystal element and between the second outer substrate and the liquid crystal element. FIG. 1 exemplarily shows an optical device comprising intermediate layers (200a, 200b) positioned between a first outer substrate (100a) and a liquid crystal element (300) and between the second outer substrate (100b) and the liquid crystal element (300), respectively.

The optical device may further comprise an outer layer (400) surrounding the sides of the liquid crystal element (300). The optical device according to the present disclosure controls the relationship between the thickness of the outer layer and the liquid crystal element or the relationship between the storage elastic moduli of the outer layer and the pressure-sensitive adhesive layer, thereby being capable of minimizing the pressing and/or crowding defects that may occur upon lamination of the optical device and the outer substrates.

In one example, the optical device of the present disclosure may satisfy Equation 1 below.

$$-T2\times 0.4 \leq T1-T2 \leq T2\times 0.4 \qquad \text{[Equation 1]}$$

In Equation 1, T1 is the thickness of the outer layer, and T2 is the thickness of the liquid crystal element.

When the outer layer is composed of a single layer or a single film, the thickness (T1) of the outer layer may mean the thickness of the relevant layer or film. When the outer layer is composed of a plurality of layers or films, the thickness (T1) of the outer layer may mean the sum of the thicknesses of the plurality of layers or the plurality of films. The thickness (T2) of the liquid crystal element may mean, for example, the sum of the thicknesses of the first base layer, the pressure-sensitive adhesive layer, the spacer, and the second base layer.

When the difference (T1−T2) value between the thicknesses of the outer layer and the liquid crystal element is too small, pressing and/or crowding defects may occur in the liquid crystal element upon lamination of the optical device, so that it may be preferable that the lower limit of the difference (T1−T2) value between the thicknesses of the outer layer and the liquid crystal element is −T2×0.4 or more. Specifically, the lower limit of the difference (T1−T2) value between the thicknesses may be −T2×0.3 or more, −T2×0.2 or more, −T2×0.1 or more, −T2×0.08 or more, −T2×0.06 or more, −T2×0.04 or more or −T2×0.02 or more.

When the difference (T1−T2) value between the thicknesses of the outer layer and the liquid crystal element is too large, breakage defects of the outer substrates may occur upon lamination of the optical device, so that it may be preferable that the upper limit of the difference (T1−T2) value between the thicknesses of the outer layer and the liquid crystal element is T2×0.4 or less. Specifically, the upper limit of the difference (T1−T2) value between the thicknesses may be T2×0.35 or less, T2×0.3 or less, or T2×0.25 or less.

The thickness (T1) of the outer layer and the thickness (T2) of the liquid crystal element may be appropriately selected within a range satisfying Equation 1. In one example, the thickness (T1) of the outer layer may be in a range of 60 μm to 840 μm. In one example, the thickness (T2) of the liquid crystal element may be in a range of 100 μm to 800 μm.

In one example, the optical device of the present disclosure may satisfy Equation 2 below.

$$G1 \geq G2 \quad \text{[Equation 2]}$$

In Equation 2, G1 is the storage elastic modulus of the outer layer at 25° C., and G2 is the storage elastic modulus of the pressure-sensitive adhesive layer at 25° C. The storage elastic modulus may be a value measured at a frequency of 6 rad/sec.

When the storage elastic modulus (G1) of the outer layer is smaller than the storage elastic modulus (G2) of the pressure-sensitive adhesive layer, pressing and/or crowding defects may occur in the liquid crystal element upon lamination of the optical device, so that the storage elastic modulus (G1) of the outer layer may be controlled to be equal to the storage elastic modulus (G2) of the pressure-sensitive adhesive layer or greater than the storage elastic modulus (G2) of the pressure-sensitive adhesive layer.

When the outer layer is composed of a single layer or a single film, the storage elastic modulus (G1) of the outer layer may mean the storage elastic modulus of the relevant layer or film. When the outer layer is composed of a plurality of layers or a plurality of films, the storage elastic modulus (G1) of the outer layer may mean the storage elastic modulus of the laminate of the plurality of layers or the laminate of the plurality of films, or may mean the storage elastic modulus of the individual layer or individual film constituting the plurality of layers or the plurality of films.

In one example, when the storage elastic modulus value of the layer or film constituting the outer layer is measured differently depending on the MD (machine direction) axis or the TD (transverse direction) axis, any one of the storage elastic modulus of the MD axis and the storage elastic modulus of the TD axis may satisfy Equation 2 above, or both the storage elastic modulus of the MD axis and the storage elastic modulus of the TD axis may satisfy Equation 2 above. The MD axis and the TD axis may be perpendicular to each other.

The value of the difference (G1−G2) between the storage elastic modulus of the outer layer and the storage elastic modulus of the pressure-sensitive adhesive layer may be, for example, 9999.99 MPa or less. When the value of the difference (G1−G2) between the storage elastic modulus of the outer layer and the storage elastic modulus of the pressure-sensitive adhesive layer is excessively large, damage may occur upon lamination with the outer substrate, so that it may be advantageous to be controlled within the above range. Specifically, the value of the difference (G1−G2) of the storage elastic modulus may be 9,500 MPa or less, 9,000 MPa or less, 9,500 MPa or less, 8,000 MPa or less, 8,500 MPa or less, 7,000 MPa or 6,500 MPa or less.

The value of the difference (G1−G2) between the storage elastic modulus of the outer layer and the storage elastic modulus of the pressure-sensitive adhesive layer may be, for example, 0 MPa or more. When the value of the difference (G1−G2) of the storage elastic modulus is too small, it may not be possible to effectively improve the pressing and/or crowding defects of the liquid crystals, so that it may be advantageous to be controlled within the above range. Specifically, the value of the difference (G1−G2) of the storage elastic modulus may be 1 MPa or more, 5 MPa or more, 10 MPa or more, 20 MPa or more, 40 MPa or more, 60 MPa or more, or 80 MPa or more.

The storage elastic modulus (G1) of the outer layer and the storage elastic modulus (G2) of the pressure-sensitive adhesive layer may be appropriately selected within a range satisfying Equation 2. In one example, the storage elastic modulus (G1) of the outer layer may be in the range of 0.1 MPa to 10,000 MPa. Specifically, the storage elastic modulus (G1) of the outer layer may be 1 MPa or more, 5 MPa or more, 10 MPa or more, 100 MPa or more, 500 MPa or more, 1,000 MPa or more, or 1,500 MPa or more, and may be 10,000 MPa or less, 9,000 MPa or less, 8,000 MPa or less, 7,000 MPa or less, 6,000 MPa or less, 5,000 MPa or less, 4,000 MPa or less, 3000 MPa or less 2,000 MPa or less, 1000 MPa or less, 800 MPa or less, 600 MPa or less, 400 MPa or less, 200 MPa or less, or 100 MPa or less.

In one example, the storage elastic modulus (G2) of the pressure-sensitive adhesive layer may be in the range of 0.01 MPa to 1 MPa. Specifically, the storage elastic modulus (G2) of the pressure-sensitive adhesive layer may be 0.02 MPa or more, 0.04 MPa, 0.06 MPa, 0.08 MPa or 0.1 MPa or more, and may be 0.8 MPa or less, 0.6 MPa or less, 0.4 MPa or less, or 0.2 MPa or less. When the storage elastic modulus of the pressure-sensitive adhesive layer is too large, it may be difficult to satisfy the above conditions, and when the storage elastic modulus of the pressure-sensitive adhesive layer is too small, the pressing or pushing phenomenon of the pressure-sensitive adhesive occurs upon lamination of the liquid crystal element, thereby being capable of inhibiting electro-optical properties and appearance uniformity, so that it may be advantageous that the storage elastic modulus is controlled within the above range.

The optical device of the present disclosure may satisfy both Equations 1 and 2. In this way, it is possible to effectively minimize the pressing and/or crowding defects that may occur upon lamination of the optical device.

The first outer substrate and the second outer substrate may each independently be an inorganic substrate or a plastic substrate. A well-known inorganic substrate may be used as the inorganic substrate without any particular limitation. In one example, a glass substrate having excellent light transmittance may be used as the inorganic substrate. As an example of the glass substrate, a soda lime glass substrate, a general tempered glass substrate, a borosilicate glass substrate or an alkali-free glass substrate, and the like may be used, without being limited thereto. As the polymer substrate, a cellulose film such as TAC (triacetyl cellulose) or DAC (diacetyl cellulose); a COP (cyclo olefin copolymer) film such as norbornene derivatives; an acrylic film such as PA (polyacrylate) or PMMA (poly(methyl methacrylate); a PC (polycarbonate) film; a polyolefin film such as PE (polyethylene) or PP (polypropylene); a PVA (polyvinyl alcohol) film; a PI (polyimide) film; a sulfone-based film such as a PSF (polysulfone) film, a PPS (polyphenylsulfone) film or a PES (polyethersulfone) film; a PEEK (polyetheretherketon) film; a PEI (polyetherimide) film; a polyester-based film such as a PEN (polyethylenenaphthatlate) film or a PET (polyethyleneterephtalate) film; or a fluororesin film, and the like may be used, without being limited thereto. In each of the first outer substrate and the second outer substrate, a coating layer of: gold; silver; or a silicon compound such as silicon dioxide or silicon monoxide, or a functional layer such as an antireflection layer may also be present as needed.

In one example, the first outer substrate and/or the second outer substrate may be a glass substrate. In order to overcome the physical limitations of the liquid crystal element, glass substrates may be laminated to both sides of the liquid crystal element, or a glass substrate may be laminated to one side of the liquid crystal element and a film substrate may be laminated to the other side of the liquid crystal element, in the automobile or window industry. In the automobile industry thereof, there is a demand for laminating glass substrates to both sides of a liquid crystal element via an adhesive layer. However, the liquid crystal element is vulnerable to external pressures due to the use of the pressure-sensitive adhesive layer, so that defects such as cell gap collapse, or flowing or crowding of the liquid crystals may occur in a glass laminating process such as the autoclave at high temperatures and high pressures. According to the present invention, as described below, the thicknesses of the first intermediate layer and the second intermediate layer are controlled, whereby the defects can be minimized, and the structural stability and the quality uniformity of the optical device can be secured.

The first outer substrate and the second outer substrate may each have a thickness of about 0.3 mm or more. In another example, the thickness may be about 0.5 mm or more, 1 mm or more, 1.5 mm or more, or about 2 mm or more, and may also be about 10 mm or less, 9 mm or less, 8 mm or less, 7 mm or less, 6 mm or less, 5 mm or less, 4 mm or less, or about 3 mm or less.

The first outer substrate and the second outer substrate may be a flat substrate or may be a substrate having a curved surface shape. For example, the first outer substrate and the second outer substrate may be simultaneously flat substrates, simultaneously have a curved surface shape, or any one may be a flat substrate and the other may be a substrate having a curved surface shape. In addition, here, in the case of having the curved surface shape at the same time, the respective curvatures or curvature radii may be the same or different. In this specification, the curvature or curvature radius may be measured in a manner known in the industry, and for example, may be measured using a contactless apparatus such as a 2D profile laser sensor, a chromatic confocal line sensor or a 3D measuring confocal microscopy. The method of measuring the curvature or curvature radius using such an apparatus is known.

With respect to the first outer substrate and the second outer substrate, for example, when the curvatures or curvature radii on the front surface and the back surface are different, the respective curvatures or curvature radii of the opposing surfaces, that is, the curvature or curvature radius of the surface facing the second outer substrate in the case of the first outer substrate and the curvature or curvature radius of the surface facing the first outer substrate in the case of the second outer substrate may be a reference. Furthermore, when the relevant surface has portions that the curvatures or curvature radii are not constant and different, the largest curvature or curvature radius may be a reference, or the smallest curvature or curvature radius may be a reference, or the average curvature or average curvature radius may be a reference.

The first outer substrate and the second outer substrate may each have a difference in curvature or curvature radius within about 10%, within 9%, within 8%, within 7%, within 6%, within 5%, within 4%, within 3%, within 2% or within about 1%. When a large curvature or curvature radius is CL and a small curvature or curvature radius is CS, the difference in curvature or curvature radius is a value calculated by $100\% \times (CL-CS)/CS$. In addition, the lower limit of the difference in curvature or curvature radius is not particularly limited. Since the differences in curvatures or curvature radii of the first and second outer substrates can be the same, the difference in curvature or curvature radius may be about 0% or more, or more than about 0%. The control of such a curvature or curvature radius is useful in a structure in which a liquid crystal element contacts the intermediate layers as in the optical device of the present disclosure. That is, when a difference in the curvature or curvature radius exceeds 10%, a problem in which the bonded outer substrates are spread due to deterioration of bonding force may occur at the time when the outer substrates and the liquid crystal element are in contact with the intermediate layers to be described below. However, if it is controlled within 10%, it is possible to effectively prevent the problem that the bonded outer substrates are spread due to deterioration of the bonding force.

The first outer substrate and the second outer substrate may have the same curvature sign. In other words, the first and second outer substrates may be bent in the same direction. That is, in the above case, both the center of curvature of the first outer substrate and the center of curvature of the second outer substrate exist in the same portion of the upper part and the lower part of the first and second outer substrates. When the first and second outer substrates are bent in the same direction, the first and second outer substrates can be more efficiently bonded by the intermediate layers, and after bonding, the bonding force deterioration of the first and second outer substrates and the liquid crystal element and/or the polarizer can be prevented more effectively.

The specific range of each curvature or curvature radius of the first outer substrate and the second outer substrate is not particularly limited. In one example, the curvature radius of each of the first and second outer substrates may be about 100R or more, 200R or more, 300R or more, 400R or more, 500R or more, 600R or more, 700R or more, 800R or more, or about 900R or more, or may be about 10,000R or less, 9,000R or less, 8,000R or less, 7,000R or less, 6,000R or less, 5,000R or less, 4,000R or less, 3,000R or less, 2,000R or less, 1,900R or less, 1,800R or less, 1,700R or less, 1,600R or less, 1,500 R or less, 1,400R or less, 1,300R or less, 1,200R or less, 1,100R or less, or about 1,050R or less. Here, R means the degree of curvature of a circle having a radius of 1 mm. Thus, here, for example, 100R is the degree of curvature of a circle having a radius of 100 mm or the curvature radius for such a circle. The first and second outer substrates may have the same or different curvature radii in the above range. In one example, when the curvatures of the first and second outer substrates are different from each other, the curvature radius of the substrate having a large curvature among them may be within the above range. In one example, when the curvatures of the first and second outer substrates are different from each other, a substrate having a large curvature among them may be a substrate that is disposed in the gravity direction upon using the optical device. When the curvature or curvature radius of the first and second substrates is controlled as above, the net force, which is the sum of the restoring force and the gravity, may act to prevent the widening, even if the bonding force by the intermediate layer to be described below is decreased.

In one example, the optical device may not comprise polarizers between the first outer substrate and the liquid crystal element and between the second outer substrate and the liquid crystal element. FIG. 1 exemplarily shows an optical device without any polarizer. In another example, the optical device may further comprise a polarizer in at least one of positions between the first outer substrate and the liquid crystal element and between the second outer substrate and the liquid crystal element. FIG. 2 exemplarily shows an optical device comprising a first polarizer (500a) positioned between the first outer substrate and the liquid crystal element and a second polarizer (500b) positioned between the second outer substrate and the liquid crystal element. The optical device may comprise an intermediate layer (200a) positioned between the first outer substrate and the first polarizer, an intermediate layer (200b) positioned between the first polarizer and the liquid crystal element, an intermediate layer (200c) positioned between the liquid crystal element and the second polarizer, and an intermediate layer (200d) positioned between the second polarizer and the second outer substrate.

In this specification, the term polarizer means a film, sheet or element having a polarization function. The polarizer is a functional element capable of extracting light vibrating in one direction from incident light vibrating in multiple directions.

The polarizer may be an absorption type polarizer or a reflection type polarizer. In this specification, the absorption type polarizer means an element showing selective transmission and absorption characteristics with respect to incident light. The polarizer may transmit, for example, light vibrating in any one direction from incident light vibrating in multiple directions, and may absorb light vibrating in the other directions. In this specification, the reflection type polarizer means an element showing selective transmission and reflection characteristics with respect to incident light. The polarizer may transmit, for example, light vibrating in any one direction from incident light vibrating in multiple directions, and may reflect light vibrating in the other directions. According to one example of the present disclosure, the polarizer may be an absorption type polarizer.

The polarizer may be a linear polarizer. In this specification, the linear polarizer means a case in which the selectively transmitted light is linearly polarized light vibrating in any one direction, and the selectively absorbed or reflected light is linearly polarized light vibrating in a direction perpendicular to the vibration direction of the linearly polarized light. In the case of the absorption type linear polarizer, the light transmission axis and the light absorption axis may be perpendicular to each other. In the case of the reflection type linear polarizer, the light transmission axis and the light reflection axis may be perpendicular to each other.

In one example, the polarizers may each be a stretched polymer film dyed with iodine or an anisotropic dye. As the stretched polymer film, a PVA (poly(vinyl alcohol)) stretched film may be exemplified. In another example, each of the first polarizer and the second polarizer may be a guest-host type polarizer in which a liquid crystal polymerized in an oriented state is a host, and an anisotropic dye arranged according to the orientation of the liquid crystal is a guest. In another example, the polarizers may each be a thermotropic liquid crystal film or a lyotropic liquid crystal film.

A protective film, an antireflection film, a retardation film, a pressure-sensitive adhesive layer, an adhesive layer, a surface treatment layer, and the like may be additionally formed on one side or both sides of the polarizers, respectively. The retardation film may be, for example, a ¼ wave plate or a ½ wave plate. The ¼ wave plate may have an in-plane retardation value for light having a wavelength of 550 nm in a range of about 100 nm to 180 nm, 100 nm or 150 nm. The ½ wave plate may have an in-plane retardation value for light having a wavelength of 550 nm in a range of about 200 nm to 300 nm or 250 nm to 300 nm. The retardation film may be, for example, a stretched polymer film or a liquid crystal polymerization film.

The transmittance of each of the polarizers for light having a wavelength of 550 nm may be in a range of 40% to 50%. The transmittance may mean single transmittance of the polarizer for light having a wavelength of 550 nm. The single transmittance of the polarizer can be measured using, for example, a spectrometer (V7100, manufactured by Jasco). For example, after the air is set to the base line in a state where the polarizer sample (not including the upper and lower protective films) is placed on the apparatus and each transmittance is measured in a state in which the axis of the polarizer sample is vertically and horizontally aligned with the axis of the reference polarizer, the single transmittance can be calculated.

When it is assumed that the blocking state is implemented in the first orientation state of the liquid crystal element, the polarizers may be disposed in the optical device such that the angle formed by the average optical axis (vector sum of optical axes) of the first orientation state and the light absorption axis of the polarizer is about 80 degrees to about 100 degrees or about 85 degrees to about 95 degrees, or approximately vertical, or may be disposed in the optical device such that it is 35 degrees to about 55 degrees or about 40 degrees to about 50 degrees, or approximately 45 degrees.

FIG. 3 exemplarily shows a liquid crystal element. As shown in FIG. 3, the liquid crystal element may comprise a first base layer (10a), a pressure-sensitive adhesive layer (10c) formed on the inside of the first base layer, a second base layer (20a) disposed opposite to the first base layer (10a), a spacer (20c) formed on the inside of the second base layer (20a) and a liquid crystal layer (30) positioned between the first base layer (10a) and the second base layer (20a).

As the first base layer and the second base layer, for example, an inorganic film such as a glass film, a crystalline or amorphous silicon film or a quartz or ITO (indium tin oxide) film, or a polymer film may be used, and in terms of implementing flexible elements, a polymer film may be used.

In one example, each of the first base layer and the second base layer may be a polymer film. As the polymer film, TAC (triacetyl cellulose); COPs (cyclo olefin copolymers) such as norbornene derivatives; PMMA (poly(methyl methacrylate); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone), PEI (polyetherimide); PEN (polyethylenenaphthatlate); PET (polyethyleneterephtalate); PI (polyimide); PSF (polysulfone); PA (polyarylate) or an amorphous fluororesin, and the like may be used, without being limited thereto. In the first base layer and the second base layer, a coating layer of gold, silver or a silicon compound such as silicon dioxide or silicon monoxide, or a functional layer such as an antireflection layer may also be present as needed.

The first base layer and the second base layer may each have a thickness of about 10 µm to about 1,000 µm. As another example, the base layers may each have a thickness of about 20 µm or more, 40 µm or more, 60 µm or more, 80 µm or more, 100 µm or more, 120 µm or more, 140 µm or more, 160 µm or more, or about 180 µm or more, and may be about 900 µm or less, 800 µm or less, 700 µm or less, 600 µm or less, 500 µm or less, or about 400 µm or less. When the thicknesses of the first base layer and the second base layer satisfy the above range, it is possible to reduce appearance defects such as wrinkles at the time of manufacturing an optical device by laminating the liquid crystal element with outer substrates.

The pressure-sensitive adhesive layer may be optically transparent. The pressure-sensitive adhesive layer may have average transmittance of about 80% or more, 85% or more, 90% or more, or 95% or more for the visible light region, for example, a wavelength of 380 nm to 780 nm.

The pressure-sensitive adhesive layer may be a liquid crystal orientational pressure-sensitive adhesive layer. The pressure-sensitive adhesive layer may be, for example, a vertically orientational pressure-sensitive adhesive layer or a horizontally orientational pressure-sensitive adhesive layer. In this specification, the "vertically orientational pressure-sensitive adhesive" may mean a pressure-sensitive adhesive having attachment force capable of bonding the upper substrate and the lower substrate while imparting vertical orientation force to the adjacent liquid crystal compound. In this specification, the "horizontally orientational pressure-sensitive adhesive" may mean a pressure-sensitive adhesive having attachment force capable of bonding the upper substrate and the lower substrate while imparting horizontal orientation force to the adjacent liquid crystal compound. The pretilt angle of the adjacent liquid crystal compound with respect to the vertically orientational pressure-sensitive adhesive may be in a range of 80 degrees to 90 degrees, 85 degrees to 90 degrees or about 87 degrees to 90 degrees, and the pretilt angle of the adjacent liquid crystal compound with respect to the horizontally orientational pressure-sensitive adhesive may be in a range of 0 degrees to 10 degrees, 0 degrees to 5 degrees or 0 degrees to 3 degrees.

In this specification, the pretilt angle may mean an angle formed by a director of a liquid crystal compound with respect to a plane horizontal to a liquid crystal orientational pressure-sensitive adhesive or an alignment film in a state where no voltage is applied. In this specification, the director of the liquid crystal compound may mean the optical axis or the slow axis of the liquid crystal layer. Alternatively, the director of the liquid crystal compound may mean a long axis direction when the liquid crystal compound has a rod shape, and may mean an axis parallel to the normal direction of the disk plane when the liquid crystal compound has a discotic shape.

The thickness of the pressure-sensitive adhesive layer may be, for example, in a range of 3 µm to 15 µm. When the thickness of the pressure-sensitive adhesive layer is within the above range, it may be advantageous to minimize defects such as pressing or pushing of the pressure-sensitive adhesive when used in the manufacture of a liquid crystal element, while securing attachment force between the upper substrate and the lower substrate.

As the pressure-sensitive adhesive layer, various types of pressure-sensitive adhesives known in the industry as a so-called OCA (optically clear adhesive) may be appropriately used. The pressure-sensitive adhesive may be different from an OCR (optically clear resin) type adhesive which is cured after the object to be attached is bonded in that it is cured before the object to be attached is bonded. As the pressure-sensitive adhesive, for example, an acrylic, silicone-based, epoxy-based or urethane-based pressure-sensitive adhesive may be applied.

The pressure-sensitive adhesive layer may comprise a cured product of a pressure-sensitive adhesive resin. In one example, the pressure-sensitive adhesive layer may comprise a silicone-based pressure-sensitive adhesive. The silicone pressure-sensitive adhesive may comprise a cured product of a curable silicone compound as the pressure-sensitive adhesive resin.

The type of the curable silicone compound is not particularly limited, and for example, a heat-curable silicone compound or an ultraviolet-curing silicone compound may be used. The curable silicone compound may be referred to as a pressure-sensitive adhesive resin.

In one example, the curable silicone compound may be an addition-curing silicone compound.

Specifically, the addition-curing silicone compound may be exemplified by (1) an organopolysiloxane containing two or more alkenyl groups in the molecule and (2) an organopolysiloxane containing two or more silicon-bonded hydrogen atoms in the molecule, but is not limited thereto. Such a silicone compound can form a cured product by addition reaction, for example, in the presence of a catalyst to be described below.

A more specific example of the (1) organopolysiloxane, which can be used in the present disclosure, may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1_2SiO_{1/2}$ and a siloxane unit represented by $R^1_2R^2SiO_{1/2}$ and a siloxane unit represented by $SiO_{4/2}$, an organopolysiloxane copolymer comprising a siloxane unit represented by $R^1_2R^2SiO_{1/2}$ and a siloxane unit represented by $SiO_{4/2}$, an organopolysiloxane copolymer comprising a siloxane unit represented by $R^1R^2SiO_{2/2}$ and a siloxane unit represented by $R^1SiO_{3/2}$ or a siloxane unit represented by $R^2SiO_{3/2}$, and a mixture of two or more of the foregoing, but is not limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group, or a 3,3,3-trifluoropropyl group, and the like. In addition, here, R2 is an alkenyl group, which may be, specifically, a vinyl group, an allyl group, a butenyl group, a pentenyl group, a hexenyl group or a heptenyl group, and the like.

A more specific example of the (2) organopolysiloxane, which can be used in the present disclosure, may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1_3SiO_{1/2}$, a siloxane unit represented by $R^1_2HSiO_{1/2}$ and a siloxane unit represented by $SiO_{4/2}$, an organopolysiloxane copolymer comprising a siloxane unit represented by $R^1_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

When the pressure-sensitive adhesive layer is a vertical orientation pressure-sensitive adhesive layer, the pressure-sensitive adhesive may have a surface energy of 16 mN/m or less. The lower limit of the surface energy may be, for example, 5 mN/m or more. When the pressure-sensitive adhesive layer is a horizontal orientation pressure-sensitive adhesive layer, the surface energy may be greater than 16 mN/m. The upper limit of the surface energy may be, for example, 50 mN/m or less. The surface energy can be measured using a drop shape analyzer (KRUSS' DSA100 product). Specifically, a process that deionized water with a known surface tension is dropped on the surface of the pressure-sensitive adhesive to obtain the contact angle is repeated 5 times, thereby obtaining the average value of the resulting five contact angle values, and equally a process that diiodomethane with a known surface tension is dropped thereon to obtain the contact angle is repeated 5 times, thereby obtaining the average value of the resulting five contact angle values. Then, the surface energy was obtained by substituting a numerical value (Strom value) for the surface tension of the solvent by the Owens-Wendt-Rabel-Kaelble method using the obtained average values of the contact angles for deionized water and diiodomethane. The surface energy (γsurface) of the sample can be calculated by considering the dispersion force between nonpolar molecules and the interaction force between polar molecules (γsurface=γdispersion+γpolar), where the ratio of the polar term (γpolar) in the surface energy γsurface can be defined as polarity of the surface.

The upper substrate and the lower substrate of the liquid crystal element may be attached to each other by a pressure-sensitive adhesive layer. Specifically, the pressure-sensitive adhesive layer of the upper substrate and the spacer of the lower substrate may be attached to each other. When the alignment film is formed on the spacer of the lower substrate, a region corresponding to the spacer of the alignment film may be attached to the pressure-sensitive adhesive layer of the upper substrate.

The liquid crystal layer may comprise a liquid crystal compound. As the liquid crystal compound, a liquid crystal compound, the orientation direction of which may be changed by application of an external action, may be used. In this specification, the term "external action" may mean any external factor that may affect the behavior of a material included in the liquid crystal layer, for example, an external voltage or the like. Therefore, the state where there is no external action may mean a state where there is no application of an external voltage or the like.

The type and physical properties of the liquid crystal compound may be appropriately selected in consideration of the purpose of the present disclosure. In one example, the liquid crystal compound may be a nematic liquid crystal or a smectic liquid crystal. The nematic liquid crystal may mean a liquid crystal that rod-shaped liquid crystal molecules are arranged in parallel in the long-axis direction of the liquid crystal molecules although there is no regularity in their positions. The smectic liquid crystal may mean a liquid crystal that rod-shaped liquid crystal molecules are regularly arranged to form a layered structure and are arranged in parallel with regularity in the long axis direction. According to one example of the present disclosure, the liquid crystal compound may be a nematic liquid crystal compound.

As the nematic liquid crystal compound, one having a clearing point of, for example, about 40° C. or more, about 50° C. or more, about 60° C. or more, about 70° C. or more, about 80° C. or more, about 90° C. or more, about 100° C. or more, or about 110° C. or more, or having a phase transition point in the above range, that is, a phase transition point to an isotropic phase on a nematic phase, can be selected. In one example, the clearing point or phase transition point may be about 160° C. or less, about 150° C. or less, or about 140° C. or less.

The liquid crystal compound may be a non-reactive liquid crystal compound. The non-reactive liquid crystal compound may mean a liquid crystal compound having no polymerizable group. The polymerizable group may be exemplified by an acryloyl group, an acryloyloxy group, a methacryloyl group, a methacryloyloxy group, a carboxyl group, a hydroxy group, a vinyl group or an epoxy group, and the like, but is not limited thereto, and a functional group known as the polymerizable group may be included.

The liquid crystal compound may have dielectric constant anisotropy of a positive number or a negative number. The absolute value of the dielectric constant anisotropy of the liquid crystal compound may be appropriately selected in consideration of the purpose of the present disclosure. The term "dielectric constant anisotropy (Δε)" may mean a difference (ε//−ε⊥) between the horizontal dielectric constant (ε//) and the vertical dielectric constant (ε⊥) of the liquid crystal. In this specification, the term horizontal dielectric constant (ε//) means a dielectric constant value measured along the direction of an electric field in a state where a voltage is applied so that the director of the liquid crystal and the direction of the electric field by the applied voltage are substantially horizontal, and the vertical dielectric constant (ε ⊥) means a dielectric constant value measured along the direction of an electric field in a state where a voltage is applied so that the director of the liquid crystal and the direction of the electric field by the applied voltage are substantially perpendicular.

The refractive index anisotropy of the liquid crystal compound may be appropriately selected in consideration of the purpose of the present disclosure. In this specification, the term "refractive index anisotropy" may mean a difference between an extraordinary refractive index and an ordinary refractive index of a liquid crystal compound. The refractive index anisotropy of the liquid crystal compound may be, for example, 0.01 to 0.3. The refractive index anisotropy may be 0.01 or more, 0.05 or more, or 0.07 or more, and may be 0.3 or less, 0.2 or less, 0.15 or less, or 0.13 or less.

The liquid crystal layer may further comprise a dichroic dye. When the liquid crystal layer comprises a dichroic dye, the cell gap fluctuation is less affected upon a lamination process of outer substrates even if the liquid crystal element comprises a pressure-sensitive adhesive layer, so that there is an advantage that the thickness of the intermediate layers can be made relatively thin for securing structural stability and quality uniformity of the liquid crystal element.

The dichroic dye may control light transmittance variable properties of the liquid crystal layer. In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region.

The liquid crystal layer comprising the liquid crystal compound and the dichroic dye may be a GHLC layer (guest host liquid crystal layer). In this specification, the "GHLC layer (guest host liquid crystal layer)" may mean a functional layer that dichroic dyes are arranged together depending on arrangement of the liquid crystal compound to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

As the dichroic dye, for example, a known dye known to have a property capable of being aligned according to the alignment state of the liquid crystal compound by a so-called guest host effect may be selected and used. An example of such a dichroic dye includes azo dyes, anthraquinone dyes, methine dyes, azomethine dyes, merocyanine dyes, naphthoquinone dyes, tetrazine dyes, phenylene dyes, quaterrylene dyes, benzothiadiazole dyes, diketopyrrolopyrrole dyes, squaraine dyes or pyromethene dyes, and the like, but the dyes applicable in the present disclosure are not limited thereto.

As the dichroic dye, a dye having a dichroic ratio, that is, a value obtained by dividing the absorbance of the polarized light parallel to the long axis direction of the dichroic dye by the absorbance of the polarized light parallel to the direction perpendicular to the long axis direction, of 5 or more, 6 or more, or 7 or more, can be used. The dye may satisfy the dichroic ratio in at least a part of the wavelengths or any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less or so.

The content of the dichroic dye in the liquid crystal layer may be appropriately selected in consideration of the purpose of the present disclosure. For example, the content of the dichroic dye in the liquid crystal layer may be 0.1 wt % or more, 0.25 wt % or more, 0.5 wt % or more, 0.75 wt % or more, 1 wt % or more, 1.25 wt % or more, or 1.5 wt % or more. The upper limit of the content of the dichroic dye in the liquid crystal layer may be, for example, 5.0 wt % or less, 4.0 wt % or less, 3.0 wt % or less, 2.75 wt % or less, 2.5 wt % or less, 2.25 wt % or less, 2.0 wt % or less, 1.75 wt % or less, or 1.5 wt % or less. When the content of the dichroic dye in the liquid crystal layer satisfies the above range, it is possible to provide an optical device having excellent transmittance variable characteristics. In one example, as the content of the dichroic dye increases within the above range, it is possible to provide an optical device having excellent transmittance variable characteristics.

The thickness of the liquid crystal layer is not particularly limited, and for example, the thickness of the liquid crystal layer may be about 0.01 μm or more, 0.05 μm or more, 0.1 μm or more, 0.5 μm or more, 1 μm or more, 1.5 μm or more, 2 μm or more, 2.5 μm or more, 3 μm or more, 3.5 μm or more, 4 μm or more, 4.5 μm or more, 5 μm or more, 5.5 μm or more, 6 μm or more, 6.5 μm or more, 7 μm or more, 7.5 μm or more, 8 μm or more, 8.5 μm or more, 9 μm or more, or 9.5 μm or more. The upper limit of the thickness of the liquid crystal layer is not particularly limited, which may generally be about 30 μm or less, 25 μm or less, 20 μm or less, or 15 μm or less.

The liquid crystal layer may switch between a first orientation state and a second orientation state different from the first orientation state. The switching may be adjusted, for example, through the application of external energy such as a voltage. For example, the liquid crystal layer may maintain any one of the first and second orientation states in a state where no voltage is applied, and may be switched to the other orientation state by voltage application.

As the first orientation state and/or the second orientation state, a horizontal orientation state, a vertical orientation state, a twist orientation state, an oblique orientation state, a hybrid orientation state, and the like may be exemplified.

In this specification, the "horizontal orientation state" is a state where directors of a liquid crystal compound in a liquid crystal layer are arranged approximately parallel to the plane of the liquid crystal layer, where for example, the angle formed by the director of the liquid crystal compound with respect to the plane of the liquid crystal layer may be, for example, in a range of about −10 degrees to 10 degrees or −5 degrees to 5 degrees, or it may form approximately about 0 degrees.

In this specification, the "vertical orientation state" is a state where directors of a liquid crystal compound in a liquid crystal layer are arranged approximately perpendicular to the plane of the liquid crystal layer, where for example, the angle formed by the director of the liquid crystal compound with respect to the plane of the liquid crystal layer may be, for example, in a range of about 80 degrees to 100 degrees or 85 degrees to 95 degrees, or it may form approximately about 90 degrees.

In this specification, the "twist orientation state" may mean a spiral structure in which directors of a liquid crystal compound in a liquid crystal layer form layers while twisting along an imaginary spiral axis and oriented. The twist orientation state may be implemented in a vertical, horizontal or oblique orientation state. That is, the vertical twist orientation mode is a state where individual liquid crystal compounds form layers while twisting along the spiral axis in a vertically oriented state; the horizontal twist orientation mode is a state where individual liquid crystal compounds form layers while twisting along the spiral axis in a horizontally oriented state; and the oblique twist orientation mode is a state where individual liquid crystal compounds form layers while twisting along the spiral axis in an obliquely oriented state.

In this specification, the "oblique orientation state" may mean an orientation state where a tilt angle, which is an angle formed by a director of a liquid crystal compound in a liquid crystal layer with respect to the plane of the liquid crystal layer, is out of the tilt angle of the horizontal orientation state and the tilt angle of the vertical orientation state. In the oblique orientation state, the tilt angle may be, for example, greater than 10 degrees to less than 80 degrees. In this specification, the "hybrid orientation state" may mean an orientation state where a tilt angle, which is an angle formed by a director of a liquid crystal compound in a liquid crystal layer with respect to the plane of the liquid crystal layer, gradually increases or decreases along the thickness direction of the liquid crystal layer.

The liquid crystal element may further comprise a first electrode layer (10b) formed on the inner surface of the first base layer (10a). At this time, the pressure-sensitive adhesive layer (10c) may be present on the inner surface of the first electrode layer (10b). That is, the first electrode layer (10b) may exist between the first base layer (10a) and the pressure-sensitive adhesive layer (10c). The liquid crystal element may further comprise a second electrode layer (20b) formed on the inner surface of the second base layer (20a). At this time, the spacer (20c) may be present on the inner surface of the second electrode layer (20b). That is, the second electrode layer (20b) may exist between the second base layer (20a) and the spacer (20c).

The first electrode layer and the second electrode layer may serve to provide application of an external action, for example, an electric field, so that the material included in the liquid crystal layer transmits or blocks incident light. In one example, the first electrode layer and/or the second electrode layer may comprise a conductive polymer, a conductive metal, a conductive nanowire or a metal oxide such as ITO (indium tin oxide), and the like, but is not limited thereto. The upper and/or lower second electrode layer may be formed by, for example, depositing the conductive polymer, the conductive metal, the conductive nanowire or the metal oxide such as ITO (indium tin oxide).

The liquid crystal element may further comprise an alignment film (20d) on the inner surface of the second electrode layer (20b). The spacer (20c) may exist between the second electrode layer (20b) and the alignment film (20d). The alignment film may be formed on the spacer. That is, the top surface portion and/or the side surface portions of the spacer may be in contact with the alignment film. The bottom surface of the spacer may contact the second electrode layer. Since the pressure-sensitive adhesive layer may have liquid crystal orientation properties, the alignment film may not be included on the inner surface of the first electrode layer.

In this specification, the combination of the first base layer, the first electrode layer and the pressure-sensitive adhesive layer may be referred to as the upper substrate, and the combination of the second base layer, the second electrode layer, the spacer and the alignment film may be referred to as the lower substrate. In the liquid crystal element, the upper substrate may not comprise a separate alignment film other than the pressure-sensitive adhesive layer, and the lower substrate may comprise the alignment film.

The alignment film and the liquid crystal layer may be in contact with each other. The alignment film may be a vertical alignment film or a horizontal alignment film. In this specification, the "horizontal alignment film" may mean a layer comprising an orientational material that imparts horizontal orientation force to a liquid crystal compound present in an adjacent liquid crystal layer. In this specification, the "vertical alignment film" may mean a layer comprising an orientational material that imparts vertical orientation force to a liquid crystal compound present in an adjacent liquid crystal layer. The adjacent liquid crystal compound may have a pretilt angle with respect to the vertical alignment film in the range of 80 degrees to 90 degrees, 85 degrees to 90 degrees, or about 87 degrees to 90 degrees, and the adjacent liquid crystal compound may have a pretilt angle with respect to the horizontal alignment film in the range of 0 degrees to 10 degrees, 0 degrees to 5 degrees or 0 degrees to 3 degrees. Unlike the pressure-sensitive adhesive layer, the alignment film may not have adhesive force for bonding the upper substrate and the lower substrate. In one example, the alignment film may have peel force close to zero with regard to the first base layer in the state of the liquid crystal element of FIG. 2.

The alignment film may be a rubbing alignment film or a photo-alignment film. The orientation direction of the alignment film may be a rubbing direction in the case of a rubbing alignment film and a direction of polarized light to be irradiated in the case of a photo-alignment film, where such an orientation direction can be confirmed by a detection method using an absorption-type linear polarizer. Specifically, the orientation direction can be confirmed by disposing an absorption-type linear polarizer on one side of the liquid crystal layer in a state where the liquid crystal compound included in the liquid crystal layer is horizontally oriented, and measuring transmittance while rotating the polarizer at 360 degrees. When the side of the liquid crystal layer or the absorption-type linear polarizer is irradiated with light in the above state and simultaneously the luminance (transmittance) is measured from the other side, the transmittance tends to be low, if the absorption axis or transmission axis coincides with the orientation direction of the liquid crystal alignment film, where the orientation direction can be confirmed through simulation reflecting the refractive index anisotropy of the applied liquid crystal compound or the like. A method of confirming the orientation direction according to the mode of the liquid crystal layer is known, and in the present disclosure, the orientation direction of the alignment film can be confirmed by such a known method.

The alignment film may comprise one or more selected from the group consisting of a material known to exhibit orientation ability by rubbing orientation such as a polyimide compound, a poly(vinyl alcohol) compound, a poly(amic acid) compound, a polystyrene compound, a polyamide compound and a polyoxyethylene compound, or a material known to exhibit orientation ability by light irradiation such as a polyimide compound, a polyamic acid compound, a polynorbornene compound, a phenylmaleimide copolymer compound, a polyvinylcinnamate compound, a polyazobenzene compound, a polyethyleneimide compound, a polyvinylalcohol compound, a polyamide compound, a polyethylene compound, a polystyrene compound, a polyphenylenephthalamide compound, a polyester compound, a CMPI (chloromethylated polyimide) compound, a PVCI (polyvinylcinnamate) compound and a polymethyl methacrylate compound, but is not limited thereto.

The spacer (20c) may maintain the gap between the upper substrate and the lower substrate. The liquid crystal layer may be present in a region where the spacer does not exist between the upper substrate and the lower substrate.

The spacer may be a patterned spacer. The spacer may have a column shape or a partition wall shape. The partition wall may partition the space between the lower substrate and the upper substrate into two or more spaces. In the region where the spacer does not exist, other films or other layers present in the lower part may be exposed. For example, the second electrode layer may be exposed in a region where the spacer does not exist. The alignment film may cover the spacer and the second electrode layer exposed in the region where the spacer is not present. In the liquid crystal element in which the upper substrate and the lower substrate are bonded together, the alignment film present on the spacer of the lower substrate and the pressure-sensitive adhesive layer of the upper substrate may be in contact with each other.

The liquid crystal compound and the above-described additives, for example, the dichroic dye, the chiral agent, and the like may be present in the region between the upper substrate and the lower substrate where the spacer does not exist. The shape of the spacer is not particularly limited, which can be applied without limitation so as to have, for example, a circle, an ellipse, or other polygonal-shaped polyhedrons.

The spacer may comprise a curable resin. The type of the curable resin is not particularly limited, where for example, a thermosetting resin or a photo-curable resin, for example, an ultraviolet curable resin may be used. As the thermosetting resin, for example, a silicone resin, a silicon resin, a furan resin, a polyurethane resin, an epoxy resin, an amino resin, a phenol resin, a urea resin, a polyester resin or a melamine resin, and the like may be used, without being limited thereto. As the ultraviolet curable resin, typically an acrylic polymer, for example, a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer, and the like may be used, without being limited thereto.

The spacer may be formed by a patterning process. For example, the spacer may be formed by a photolithography process. The photolithography process may comprise a process of applying a curable resin composition on a base layer or an electrode layer and then irradiating it with ultraviolet rays via a pattern mask. The pattern mask may be patterned into an ultraviolet transmitting region and an ultraviolet blocking region. The photolithography process may further comprise a process of washing the curable resin composition irradiated with ultraviolet rays. The region irradiated with ultraviolet rays is cured, and the region irradiated with no ultraviolet rays remains in a liquid phase, so that it is removed through the washing process, whereby it can be patterned into a partition wall shape. In the photolithography process, a release treatment may be performed on the pattern mask in order to easily separate the resin composition and the pattern mask after ultraviolet irradiation, or a release paper may also be placed between the layer of the resin composition and the pattern mask.

The width (line width), spacing (pitch), thickness and area of the spacer may be appropriately selected within a range without impairing the purpose of the present disclosure. For example, the width (line width) of the spacer may be in a range of 10 μm to 500 μm or in a range of 10 μm to 50 μm. The spacing (pitch) of the spacer may be in a range of 10 μm to 1000 μm or in a range of 100 μm to 1000 μm. The area of the spacer may be about 5% or more and may be 50% or less, relative to 100% of the total area of the second base layer. When the area of the spacer is within the above range, it may be advantageous to ensure excellent electro-optical properties while adequately securing attachment force between the upper substrate and the lower substrate. The thickness of the spacer may range, for example, from 1 μm to 30 μm or from 3 μm to 20 μm.

The optical device may comprise at least one or more intermediate layers positioned between the first outer substrate and the liquid crystal element, and may comprise at least one or more intermediate layers positioned between the second outer substrate and the liquid crystal element. Therefore, the optical device may comprise at least two intermediate layers. One side of each of the first outer substrate and the second outer substrate may be in contact with the adjacent intermediate layer. Both sides of the liquid crystal element may be in contact with adjacent intermediate layers, respectively.

The number of intermediate layers of the optical device may be determined according to whether the optical device further comprises other elements in addition to the first outer substrate, the second outer substrate and the liquid crystal element. The other element may be exemplified by a polarizer or the like.

In one example, the optical device may further comprise other elements, for example, a polarizer, in addition to the liquid crystal element, between the first outer substrate and the second outer substrate. In this case, as one embodiment, the optical device may have a structure in which a first outer substrate, an intermediate layer, a liquid crystal element, an intermediate layer, a polarizer, an intermediate layer and a second outer substrate are laminated in this order. In another embodiment, the optical device may have a structure in which a first outer substrate, an intermediate layer, a polarizer, an intermediate layer, a liquid crystal element, an intermediate layer and a second outer substrate are laminated in this order. As another example, the optical device may have a structure in which a first outer substrate, an intermediate layer, a polarizer, an intermediate layer, a liquid crystal element, an intermediate layer, a polarizer, an intermediate layer and a second outer substrate are laminated in this order.

In another example, the optical device may not comprise other elements, for example, a polarizer, in addition to the liquid crystal element, between the first outer substrate and the second outer substrate. In this case, the optical device may have a structure in which the first outer substrate, the intermediate layer, the liquid crystal element, the intermediate layer and the second outer substrate are laminated in this order.

In order to overcome the physical limits of the liquid crystal element, the outer substrates can be bonded together via the intermediate layers on both sides of the liquid crystal element, but due to the low modulus of the pressure-sensitive adhesive layer, it is vulnerable to an external pressure, whereby defects such as cell gap collapse or liquid crystal flow or crowding may occur. The thicknesses of the intermediate layers included in the optical device are controlled, whereby the defects can be minimized and the structural stability and uniform appearance characteristics of the optical device can be secured.

As one example, the sum of the total thicknesses of the at least one or more intermediate layers may be 800 μm or more. The sum of the total thicknesses of the at least one or more intermediate layers means the sum of the thicknesses of all intermediate layers existing between the first outer substrate and the liquid crystal element and between the second outer substrate and the liquid crystal element. When the total thickness of the intermediate layers is within the above range, it is possible to secure structural stability and uniform appearance characteristics of the optical device by minimizing defects in the lamination process of the outer substrate. Specifically, the sum of the total thicknesses of the at least one or more intermediate layers may be 900 μm or more, 1,000 μm or more, 1,100 μm or more, 1200 μm or more, 1,300 μm or more, 1,400 μm or more, 1,500 μm or more, 1,600 μm or more, about 1,650 μm or more, 1,700 μm or more, 1,750 μm or more, 1,800 m or more, 1,850 μm or more, 1,900 μm or more, 1,950 μm or more, 2,000 μm or more, 2,100 μm or more, 2,150 μm or more, or about 2,200 μm or more. The sum of the total thicknesses of the at least one or more intermediate layers may be, for example, about 6,000 μm or less, 5,900 μm or less, 5,800 μm or less, 5,700 μm or less, 5,600 μm or less, 5,500 μm or less, 5,400 μm or less, 5,300 μm or less, 5,200 μm or less, 5,100 μm or less, or about 5,000 μm or less. When the sum of the total thicknesses of the at least one or more intermediate layers is too thick, electro-optical properties such as transmittance properties of the optical device may be deteriorated, so that it may be advantageous to be within the above range.

The at least one or more intermediate layers may each have a single-layer structure of one intermediate layer or may be a laminate of two or more sub-intermediate layers. The thickness and number of sub-intermediate layers may be controlled in consideration of the desired thickness of the intermediate layer. In one example, the thickness of the sub-intermediate layer may be in the range of 100 μm to 500 μm or in the range of 300 μm to 400 μm.

As an example, the total thicknesses (Ta) of the at least one or more intermediate layers positioned between the first outer substrate and the liquid crystal element and the total thicknesses (Tb) of the at least one or more intermediate layers positioned between the second outer substrate and the liquid crystal element may each be about 400 μm or more, 500 μm or more, 600 μm or more, 700 μm or more, 800 μm or more, 900 μm or more, 1000 m or more, or 1100 μm or more, and may be about 3,000 μm or less, 2,900 μm or less, 2,800 m or less, 2,700 μm or less, about 2,600 μm or less, about 2,500 μm or less, about 2,400 μm or less, or about 2,300 μm or less. When the thicknesses Ta and Tb are within the above ranges, it may be advantageous to secure structural stability and uniform appearance characteristics without defects in the lamination process of the outer substrates, without impairing the electro-optical properties of the optical device. The sum of the total thicknesses (Ta) of the at least one or more intermediate layers positioned between the first outer substrate and the liquid crystal element means the sum of the thicknesses of all intermediate layers existing between the first outer substrate and the liquid crystal element. In addition, the sum of the total thicknesses (Tb) of the at least one intermediate layer positioned between the second outer substrate and the liquid crystal element means the sum of the thicknesses of all intermediate layers present between the second outer substrate and the liquid crystal element.

As one example, the thickness ratio (Ta/Tb) of the total thicknesses (Ta) of the at least one or more intermediate layers positioned between the first outer substrate and the liquid crystal element to the total thicknesses (Tb) of the at least one or more intermediate layers positioned between the second outer substrate (20b) and the liquid crystal element may be in the range of 0.1 to 10. As another example, the thickness ratio (Ta/Tb) may be about 0.12 or more, about 0.13 or more, or about 0.14 or more, and may be about 9.5 or less, 9.0 or less, 8.5 or less, 8.0 or less, 7.5 or less, or about 7.0 or less. When the thickness ratio is within the range of 0.1 to 10, it is possible to more effectively improve the appearance defects of the liquid crystal element.

As one example, the storage elastic moduli of the at least one or more intermediate layers may each be 1 MPa or more. When the storage elastic moduli of the intermediate layers are low, the liquid crystal element may also be damaged because the base layer cannot withstand the stress of contraction and expansion in a high temperature durability test or a cycle test, and the like. The storage elastic modulus of the intermediate layer may be 2 MPa or more, or 4 MPa or more, and may be 100 MPa or less, 80 MPa or less, 60 MPa or less, 40 MPa or less, 20 MPa or less, 10 MPa or less, or 5 MPa or less. The storage elastic modulus may be a value measured at a temperature of 25° C. and a frequency of 6 rad/sec.

As one example, the at least one or more intermediate layers may each have a Young's modulus (E) in a range of 0.1 MPa to 100 MPa. As another example, the Young's modulus (E) of the intermediate layer may be about 0.2 MPa or more, 0.4 MPa or more, 0.6 MPa or more, 0.8 MPa or more, 1 MPa or more, 5 MPa or more, or about 10 MPa or more, and may be about 95 MPa or less, 80 MPa or less, 75 MPa or less, 70 MPa or less, 65 MPa or less, 60 MPa or less, 55 MPa or less, or about 50 MPa or less. The Young's modulus (E), for example, can be measured in the manner specified in ASTM D882, and can be measured using the equipment that can cut the film in the form provided by the relevant standard and measure the stress-strain curve (can measure the force and length simultaneously), for example, a UTM (universal testing machine). When the Young's moduli of the intermediate layers included in the optical device are within the above range, it may be more advantageous to ensure excellent durability of the optical device. When the intermediate layer is a laminate of at least two or more sub-intermediate layers, each of the sub-intermediate layers may satisfy the above Young's modulus range.

As one example, the at least one or more intermediate layers may each have a coefficient of thermal expansion of 2,000 ppm/K or less. In another example, the coefficient of thermal expansion may be about 1,900 ppm/K or less, 1,700 ppm/K or less, 1,600 ppm/K or less, or about 1.500 ppm/K or less, or may be about 10 ppm/K or more, 20 ppm/K or more, 30 ppm/K or more, 40 ppm/K or more, 50 ppm/K or more, 60 ppm/K or more, 70 ppm/K or more, 80 ppm/K or more, 90 ppm/K or more, 100 ppm/K or more, 200 ppm/K or more, 300 ppm/K or more, 400 ppm/K or more, 500 ppm/K or more, 600 ppm/K or more, 700 ppm/K or more, or about 800 ppm/K or more. The coefficient of thermal expansion of the intermediate layer can be measured, for example, according to the regulations of ASTM D696, where the coefficient of thermal expansion can be calculated by cutting it in the form provided by the relevant standard, and measuring the change in length per unit temperature, and can be measured by a known method such as the TMA (thermo-mechanic analysis). When the coefficients of thermal expansion of the intermediate layers included in the optical device are within the above range, it may be more advantageous to ensure excellent durability of the optical device. When the intermediate layer is a laminate of at least two or more sub-intermediate layers, each of the sub-intermediate layers may satisfy the range of the coefficient of thermal expansion.

The at least one or more intermediate layers may each be a thermoplastic polyurethane (TPU) adhesive layer, a polyamide adhesive layer, a polyester adhesive layer, an EVA (ethylene vinyl acetate) adhesive layer, an acrylic adhesive layer, a silicone adhesive layer or a polyolefin adhesive layer. have. According to one example of the present disclosure, the at least one or more intermediate layers may each be a thermoplastic polyurethane.

In the optical device, the outer layer may surround the sides of the liquid crystal element. In the optical device, the top area of the liquid crystal element may be smaller than the top area of the first outer substrate or the second outer substrate. Also, the top area of the liquid crystal element may be smaller than the top areas of at least one or more intermediate layers included in the optical device. In one example, the liquid crystal element may be encapsulated by an intermediate layer positioned between the first outer substrate and the liquid crystal element, an intermediate layer positioned between the second outer substrate and the liquid crystal element, and the outer layer. In this specification, the term encapsulation may mean covering the entire surface of the liquid crystal element with the intermediate layers and the outer layer. Depending on the desired structure, for example, the encapsulation structure may be implemented by a method of compressing a laminate comprising a first outer substrate, an intermediate layer, a liquid crystal element, an intermediate layer and a second outer substrate sequentially and comprising an outer layer surrounding the sides of the liquid crystal element in a vacuum state. The durability and weather resistance of the optical device are greatly improved by such an encapsulation structure, and as a result, it can be stably applied to outdoor applications such as a sunroof.

The outer layer may comprise, for example, a polymer film. In one example, the outer layer may be composed of one polymer film. In another example, the outer layer may be a laminate of two or more polymer films. In the case of a laminate of two or more polymer films, an adhesive layer to which two or more polymer films are attached may be further included. The structure of the outer layer may be appropriately selected within a range capable of securing a desired thickness and storage elastic modulus.

As the polymer film, an appropriate polymer film may be used within the range that may satisfy the storage elastic modulus of Equation 1. As the polymer film, for example, a PC (poly carbonate) film, a PE (polyethylene) film, a TPU (thermoplastic polyurethane), a COP (cyclo-olefin polymer) film, a POE (polyolefin elastomer) film, an EVA (ethylene vinyl acetate) film, and the like may be used.

The present disclosure also relates to a method for manufacturing an optical device. The manufacturing method of the optical device may comprise steps of preparing a laminate sequentially comprising a first outer substrate, at least one or more intermediate layers, a liquid crystal element, at least one or more intermediate layers and a second outer substrate, and autoclaving the laminate. Unless otherwise specified in the manufacturing method of the optical device, the contents described in the optical device may be equally applied.

The laminate may further comprise an outer layer surrounding the sides of the liquid crystal element.

When the optical device further comprises other elements, for example, a polarizer, in addition to the liquid crystal element, the laminate may further comprise other elements at a desired position, in addition to the liquid crystal element.

The autoclave process may be performed by heating and/or pressing the laminate formed after the laminating step.

The conditions of the autoclave process are not particularly limited, and it may be performed under an appropriate temperature and pressure, for example, depending on the type of the applied intermediate layers. The temperature of a typical autoclave process is about 80° C. or more, 90° C. or more, 100° C. or more, and the pressure is 2 atmospheres or more, without being limited thereto. The upper limit of the process temperature may be about 200° C. or less, 190° C. or less, 180° C. or less, or 170° C. or less or so, and the upper limit of the process pressure may be about 10 atm or less, 9 atm or less, 8 atm or less, 7 atm or less, or 6 atm or less or so.

Such an optical device can be used for various applications, and for example, can be used for eyewear such as sunglasses or AR (augmented reality) or VR (virtual reality) eyewear, an outer wall of a building or a sunroof for a vehicle, and the like. In one example, the optical device itself may be a sunroof for a vehicle. For example, in an automobile including an auto body in which at least one opening is formed, the optical device or the sunroof for a vehicle attached to the opening can be mounted and used.

Effects of Invention

The optical device of the present disclosure can ensure structural stability and good quality uniformity by maintaining the cell gap of the liquid crystal element properly, having excellent attachment force between the upper substrate and the lower substrate, and minimizing defects such as pressing or crowding.

Mode for Inventions

Hereinafter, the present disclosure will be described in detail through Examples, but the scope of the present disclosure is not limited by Examples below.

Measurement Example 1. Measurement of Storage Elastic Modulus

The storage elastic modulus was measured using TA's DMA Q800. Specifically, the storage elastic modulus value was recorded under the conditions of a temperature of 25° C., a frequency of 6 rad/sec, a force of 0.01N, and a ramp rate of 3°/min in the Multi-Frequency-Strain mode.

Example 1

Liquid Crystal Element Manufacturing

A PET film having a thickness of about 145 μm and a width×height area of 900 mm×600 mm was prepared as a first base layer. ITO (indium-tin-oxide) was deposited on the first base layer to a thickness of 50 nm to form a first electrode layer. A pressure-sensitive adhesive composition (KR-3700, Shin-Etsu) was bar-coated on the first electrode layer, and then dried at about 150° C. for about 5 minutes to form a pressure-sensitive adhesive layer having a thickness of about 10 μm. The storage modulus of the adhesive layer was about 0.1 MPa. The combination of the first base layer, the first electrode layer and the pressure-sensitive adhesive layer is referred to as an upper substrate.

As a second base layer, a PET film having a thickness of about 145 μm and a width×height area of 900 mm×600 mm was prepared. On the second base layer, ITO (indium-tin-oxide) was deposited to a thickness of 50 nm to form a second electrode layer. An acrylic resin composition (KAD-03, Minuta Tech) was coated on the second electrode layer, and then a honeycomb-type spacer (partition wall spacer) was formed by a photolithography method. The pitch of the regular hexagons (closed figure) constituting the honeycomb is about 450 μm, the height is about 6 μm, and the line width is about 30 μm. The area of the closed figure (regular hexagon) formed by the partition wall spacer was about 2.14 mm$^2$. A vertical alignment film (5661, Nissan chemical) was coated on the spacer to a thickness of about 300 nm, and then rubbed in one direction. The combination of the second base layer, the second electrode layer, the spacer, and the vertical alignment film is referred to as a lower substrate.

A liquid crystal composition was coated on the vertical alignment film of the lower substrate to form a liquid crystal layer, and then the pressure-sensitive adhesive layer of the upper substrate was laminated to face the coated surface of the liquid crystal composition. The liquid crystal composition comprised a liquid crystal compound (JNC, T12) and a chiral dopant (HCCH, S811), and the pitch (p) of the formed liquid crystal layer was about 20 μm, and the ratio (d/p) of the cell gap (d) to the pitch (p) was about 0.3. The liquid crystal element is an RTN mode liquid crystal cell in a vertical orientation state when no voltage is applied. The total thickness of the liquid crystal element is about 306 μm.

Optical Device Manufacturing

A laminate comprising a first outer substrate, a first intermediate layer, a first polarizer, a second intermediate layer, the prepared liquid crystal element, a third intermediate layer, a second polarizer, a fourth intermediate layer and a second outer substrate sequentially and comprising an outer layer surrounding the sides of the liquid crystal element was prepared. Compared to the first outer substrate, the second outer substrate was disposed in the direction of gravity.

As the first outer substrate, a glass substrate having a thickness of about 3 mm, an area of width×length=1100 mm×800 mm and a curvature radius of about 2,470R was used. As the second outer substrate, a glass substrate having a thickness of about 3 mm, an area of width×length=1100 mm×800 mm and a curvature radius of about 2,400R was used. The first polarizer and the second polarizer were each a PVA-based polarizer, which were disposed that the light transmission axis of the first polarizer and the light transmission axis of the second polarizer formed about 90 degrees. The first intermediate layer and the fourth intermediate layer are each a single layer of TPU layer (Argotec), one layer of which has a thickness of 380 μm. The second intermediate layer and the third intermediate layer are each a laminate of three TPU layers (Argotec), one layer of which has a thickness of 380 μm. The TPU layer (Argotec) used to form the first to fourth intermediate layers has a coefficient of thermal expansion of 307 ppm/K and a storage elastic modulus of 2.18 MPa. As the outer layer, a PC film (Keiwa) having a storage elastic modulus of 2000 MPa and a thickness of 300 μm was used.

An autoclave process was performed on the laminate at a temperature of about 110° C. and a pressure of about 2 atm to manufacture an optical device having the structure of FIG. 2.

Example 2

An optical device was manufactured by performing the process in the same manner as in Example 1, except that a laminate, in which two PET films having an MD direction storage elastic modulus of about 6,000 MPa, a TD direction storage elastic modulus of about 3,000 MPa and a thickness of 145 μm were attached via a pressure-sensitive adhesive layer (KR-3700, Shin-Etsu) having a storage elastic modulus of about 0.1 MPa and a thickness of 10 μm, was used as the outer layer. In Example 2, the total thickness of the outer layer was about 300 μm.

Example 3

An optical device was manufactured by performing the process in the same manner as in Example 1, except that a TPU film (Argotec) having a storage elastic modulus of about 100 MPa and a thickness of about 380 μm was used as the outer layer.

Comparative Example 1

An optical device was manufactured by performing the process in the same manner as in Example 1, except that a TPU film (Argotec) having a storage elastic modulus of about 100 MPa and a thickness of about 150 μm was used as the outer layer.

Comparative Example 2

An optical device was manufactured by performing the process in the same manner as in Example 1, except that a laminate of a TPU film (Argotec) having a storage elastic modulus of about 100 MPa and a thickness of about 380 μm and a TPU film (Argotec) having a storage elastic modulus of about 100 MPa and a thickness of about 150 μm was used as the outer layer. In comparative Example 2, the total thickness of the outer layer was about 530 μm.

Evaluation Example 1. Evaluation of Lamination Process Defects

In the optical devices manufactured in Example 1 and Comparative Example 1, it was observed whether pressing and crowding defects occurred in a state where no voltage was applied. In Example 1, the pressing defects and the crowding defects were not observed, but in Comparative Example 1, the pressing and crowding defects were observed, as shown in FIGS. 4 and 5. FIG. 4 is a camera photograph of the optical device of Comparative Example 1, and FIGS. 5A and 5B are a microscope images of the optical device of Comparative Example 1. As shown in red in FIG. 4 (shown on the left), the crowding defect region appears darker than the peripheral region because the concentration of the dichroic dye is higher than that of the peripheral region, and as shown in green in FIG. 4 (shown on the right), the pressing defect region appears brighter than the peripheral region because the concentration of the dichroic dye is lower than that of the peripheral region. In Comparative Example 2, the glass substrate was damaged during the lamination process. FIG. 5A shows the pressing defects of Comparative Example 1, and FIG. 5B shows the crowding defects of Comparative Example 1.

EXPLANATION OF REFERENCE NUMERALS

100a: first outer substrate, 100b; second outer substrate, 200a, 200b, 200c, 200d: intermediate layer, 300: liquid crystal element, 400: outer layer, 500a: first polarizer, 500b: second polarizer, 10a: first base layer, 10b: first electrode layer, 10c: pressure-sensitive adhesive layer, 20a: second base layer, 20b: second electrode layer, 20c: spacer, 20d: alignment film

The invention claimed is:

1. An optical device, comprising:
a liquid crystal element having a top surface, a bottom surface, and sides separating the top surface and the bottom surface; and
an outer layer surrounding the sides of the liquid crystal element, wherein the liquid crystal element comprises:
a first base layer;
a second base layer;
a liquid crystal layer positioned between the first base layer and the second base layer;
a pressure-sensitive adhesive layer positioned between the first base layer and the liquid crystal layer; and
a spacer to maintain a gap between the first base layer and the second base layer,
wherein the optical device satisfies Equation 1:

$-T2 \times 0.4 \leq T1-T2 \leq T2 \times 0.4$  [Equation 1]

wherein, T1 is a thickness of the outer layer, and T2 is a thickness of the liquid crystal element.

2. The optical device according to claim 1, wherein T1 is in a range of 60 μm to 840 μm.

3. The optical device according to claim 1, wherein the optical device satisfies Equation 2:

$G1 \geq G2$  [Equation 2]

wherein, G1 is a storage elastic modulus of the outer layer at a temperature of 25° C. and a frequency of 6 rad/sec, and G2 is a storage elastic modulus of the pressure-sensitive adhesive layer at a temperature of 25° C. and a frequency of 6 rad/sec.

4. The optical device according to claim 1, wherein G1−G2 is in a range of 0 MPa to 9999.99 MPa.

5. The optical device according to claim 1, wherein G1 is in a range of 0.1 MPa to 10,000 MPa.

6. The optical device according to claim 1, wherein the outer layer comprises a polymer film.

7. The optical device according to claim 1, wherein the liquid crystal layer capable of switching between a first orientation state and an orientation state different from the first orientation state when external energy is applied.

8. The optical device according to claim 1, wherein the spacer is a patterned spacer.

9. The optical device according to claim 1, wherein a ratio of an area (B) of the spacer to an area (A) of the second base layer is in a range of 5% to 50%.

10. The optical device according to claim 1, wherein the liquid crystal element further comprises:
a first electrode layer formed on an inner surface of the first base layer; and
a second electrode layer formed on an inner surface of the second base layer,
where the pressure-sensitive adhesive layer is present on an inner surface of the first electrode layer, and
wherein the spacer is present on an inner surface of the second electrode layer.

11. The optical device according to claim 10, wherein the liquid crystal element further comprises:
an alignment film present on the inner surface of the second electrode layer,
where the inner surface of the first electrode layer does not have alignment film formed thereon.

12. The optical device according to claim 1, wherein the optical device further comprises:
a first outer substrate; and
a second outer substrate,
wherein the liquid crystal element and the outer layer are present between the first outer substrate and the second outer substrate.

13. The optical device according to claim 12, further comprising:
a first intermediate layers positioned between the first outer substrate and the liquid crystal element; and
a second intermediate layer positioned between the liquid crystal element and the second outer substrate.

14. The optical device according to claim 13, wherein the liquid crystal element is encapsulated by the first and second intermediate layers and the outer layer.

15. The optical device according to claim 13, wherein a sum of the total thicknesses of the first and second intermediate layers is 800 μm or more.

16. The optical device according to claim 13, wherein the first and second intermediate layers are a thermoplastic polyurethane adhesive layer, a polyamide adhesive layer, a polyester adhesive layer, an EVA (ethylene vinyl acetate) adhesive layer, an acrylic adhesive layer, a silicone adhesive layer or a polyolefin adhesive layer.

17. An automobile, comprising:
a vehicle body having an opening formed therein; and
the optical device of claim 1 mounted in the opening.

* * * * *